Jan. 5, 1932.  H. O. RICH  1,839,500
WELDING APPARATUS
Filed Oct. 23, 1929  2 Sheets-Sheet 1
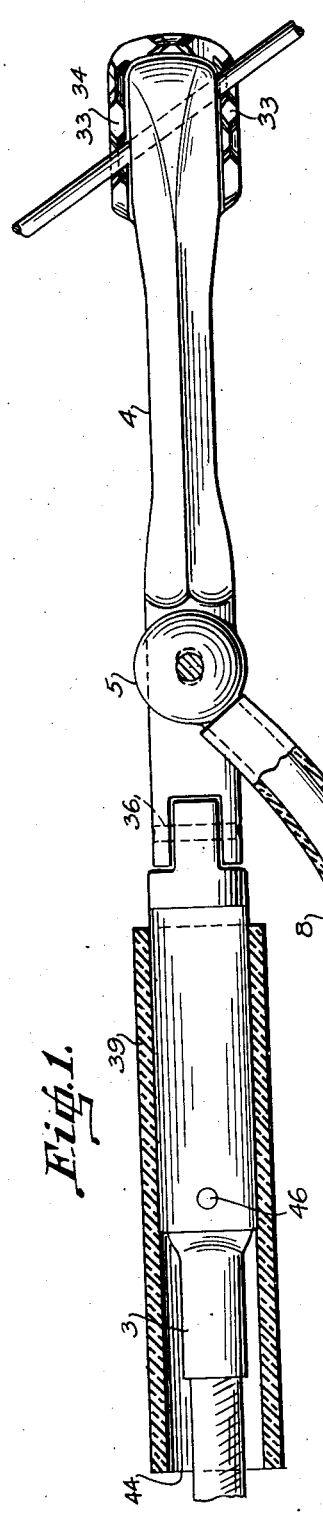
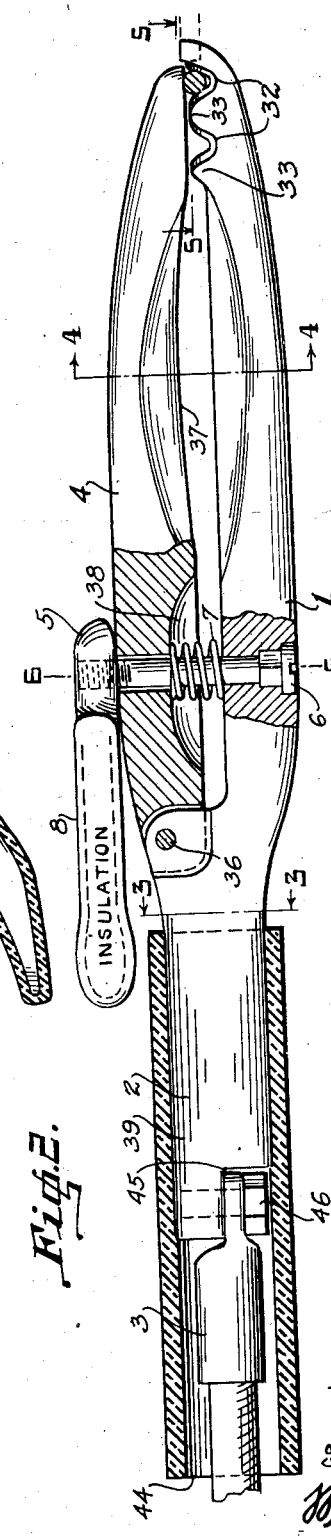
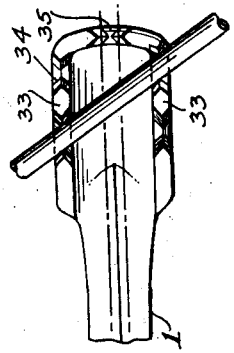
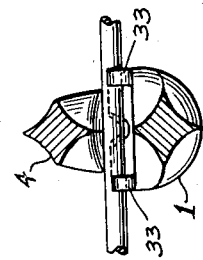
Inventor
*Herbert O. Rich*
By *Mason Fenwick Lawrence* Attorneys Jan. 5, 1932. H. O. RICH 1,839,500
WELDING APPARATUS
Filed Oct. 23, 1929 2 Sheets-Sheet 2
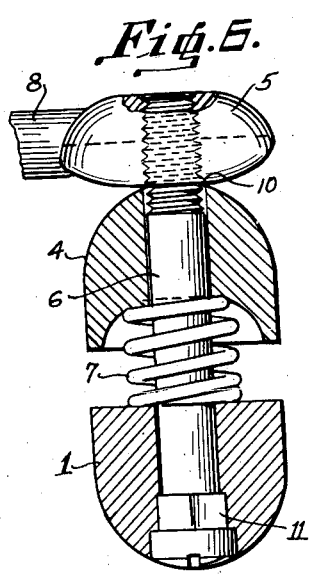
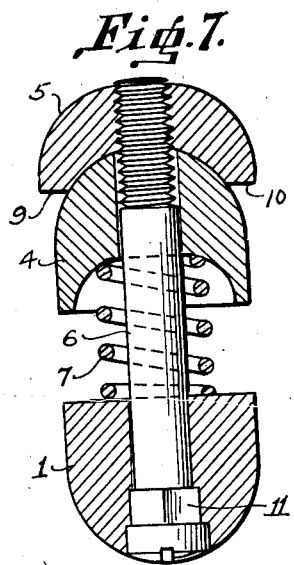
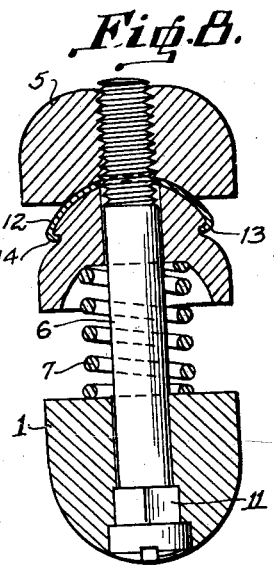
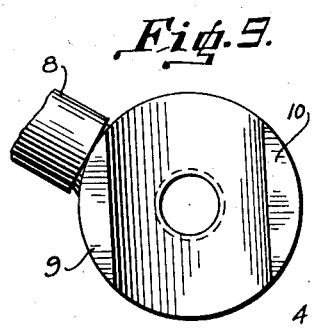
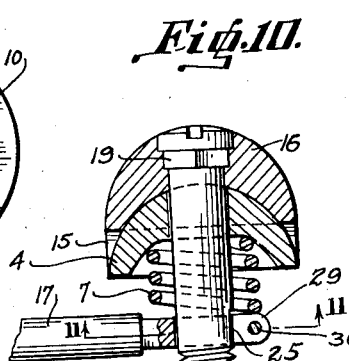
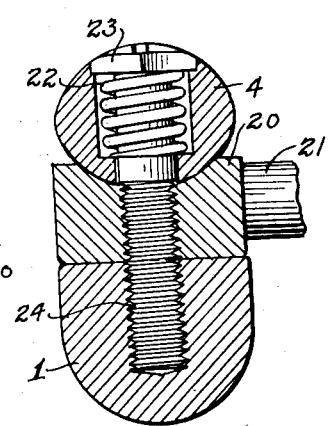
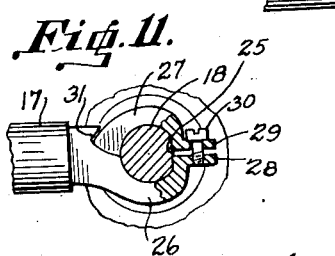
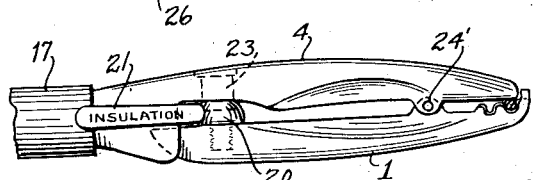
Inventor
Herbert O. Rich
By Mason Fenwick Lawrence
Attorneys Patented Jan. 5, 1932

1,839,500

UNITED STATES PATENT OFFICE

HERBERT O. RICH, OF REVERE, MASSACHUSETTS

WELDING APPARATUS

Application filed October 23, 1929. Serial No. 401,772.

This invention relates to welding apparatus, and particularly to improvements in an electrode holder.

One of the objects of the invention is to provide a construction in which arcing is eliminated at the jaws, and the heating effects of the current in any part of the electrode holder minimized.

Another object of the invention is the provision of improved locking means for the jaws of the electrode holder.

Still another object of the invention is to protect the resilient element associated with the locking means so that it will not be burned or lose its temper by contact with the work piece during the welding operation.

A further object of the invention is to provide for an "inboard" mounting of the locking means whereby the contour of the electrode holder will be improved, enabling it to work through restricted openings, without the annoyance or risk of the operating lever contacting with the sides of the said openings.

Other objects of the invention will appear as the following description of a preferred embodiment thereof proceeds.

In the drawings in which the same parts, where shown in the several figures, are denoted by the same characters of reference.

Figures 1 and 2 are, respectively, plan and side elevation views of my improved electrode holder, partly shown in section;

Figures 3 and 4 are cross sections taken, respectively, along the lines 3—3 and 4—4 of Figure 2, viewed in the direction of the arrows;

Figure 5 is a plan view taken in the plane of the line 5—5 of Figure 2, part of the electrode holder being broken away;

Figure 6 is a cross section taken along the line 6—6 of Figure 2, the parts being shown on a slightly enlarged scale, and the jaws being in a closed position;

Figure 7 is a similar view showing the jaws in open position;

Figure 8 is a similar view showing a slight modification of the invention in which a wear resisting cap of resilient nature is snapped upon the uper jaw beneath the locking cam;

Figure 9 is a bottom plan view of the cam shown in Figure 7;

Figure 10 is a vertical cross section through the locking means showing a slight modification of the invention in which the locking cam is located in a counter-sunk recess and the operating lever has an "inboard" location;

Figure 11 is a section taken along the line 11—11 of Figure 10;

Figure 12 is a further slight modification in which both the cam and operating lever are "inboard";

Figure 13 is a side elevation of the jaw portion of an electrode holder in which the fulcrum is between the locking means and the holding end of the jaw, this form being used in connection with the locking means shown in Figure 12.

Referring now in detail to the several figures, and referring first to that form of the invention shown in Figures 1 and 2, the jaw 1 is shown made integral with the shank 2 the latter being connected to the cable terminal 3 by which the operating current is led into the electrode holder. A jaw 4 is pivotally connected to the jaw 1 in operative relation to the latter, both jaws coming together into clamping relation at their outer ends for the purpose of holding an electrode. Locking means are provided for clamping the electrode positively between the said jaws.

It is known in the art to have clamping means of resilient nature, such as a spiral spring for exerting a welding holding pressure upon the electrode, but such devices are subject to the fatal fault that if the operating lever is slightly depressed through its inadvertently coming into contact with something, the pressure upon the electrode is momentarily relaxed, so that arcing occurs, the electrode burning in the jaws and the jaws themselves being burned.

The present locking means is designed to prevent such an occurence and to this end, positive clamping means are utilized comprising in the present instance a cam 5 loosely mounted upon a bolt 6 which passes through aligned apertures in the two jaws. The jaw 4 against which the cam seats and with which it co-acts is shown in Figures 6 and 7 as being cylindrically convex and the cam, as shown in Figures 7 and 9, is correspondingly concave on its lower face so that it fits upon the jaw 4 in its inactive position as shown in Figure 7. A spring 7 surrounds the bolt 6, being held in place thereby, said spring holding the jaws normally open and exerting a pressure between the respective contacting surfaces of the jaw 4 and cam 5, retaining the cam in its inactive position.

The locking means is operated by rotating the cam through pressure on the thumb lever 8 causing the elevations 9 and 10 to ride upon the sloping sides of the jaw 4, forcing the jaw downwardly against the tension of the spring 7. The cam 5 is loosely threaded on the bolt 6 and is initially adjusted relatively to the threads so that when the cam is in locked position, the clamping pressure between the ends of the jaws and the electrode is a positive pressure produced by the tensioning of the bolt 6.

The coacting faces of the cam and jaw are so curved or inclined, that in unlocking the electrode holder, to release the electrode, after the cam has been moved sufficiently to relieve the initial locking pressure, the pressure of the spring 7 quickly completes the unlocking movement by forcing the cam to ride down upon the sloping surface of the jaw, causing the jaws to open with a snap, permitting the instant ejection of the stub of the consumed electrode.

For the purpose of adjusting the locking means to properly retain electrodes of various sizes, the cam 5 may be backed off from the threads, which it engages, sufficiently to permit the polygonal portion 11 of the bolt to be shifted endwise out of the correspondingly shaped bore in the jaw 1, so that the bolt may then be rotated in either direction, thereby screwing the cam 5 further inward or outward on the bolt. When the proper position of adjustment has been reached, the bolt is again pushed into place, the pressure of the spring 7 retaining the several parts in their newly adjusted position.

Since it may be desirable to prevent excessive wear of the jaw 4, a washer 12 of wear resisting material is provided, the same being interposed between the cam and that part of the jaw 4 upon which the cam seats. The wear resisting washer 12 is preferably of resilient steel, perforated so as to pass over the end of the bolt 6, and having inturned ends or lugs 13 adapted to engage in depressions 14 suitably located at the sides of the jaw 4. In applying this wear resisting washer, it is simply slipped over the bolt 6, the cam having first been removed and then placed down upon the jaw 4, until it spreads sufficiently to snap into the recesses 4. Said recesses not only hold the wear resisting washer in place, but also prevent its rotating.

It will be noted that in the modification of the invention above described, the cam and operating lever project beyond the upper face of the jaw so as to increase the overall width of the electrode holder at this point. While, ordinarily, this is of no disadvantage, yet sometimes in working through a restricted opening, it is desirable to have the width of the electrode holder as small as possible. It is also equally advantageous at times to have the operating lever at some point where it will be entirely out of the way and not likely to be struck and perhaps shifted during the operation of the device, by some part of the working piece or other obstruction.

With this purpose in view, the modification shown in Figures 10 and 12 have been devised.

In that form of the invention shown in Figure 10, the jaw 4 has been recessed as indicated at 15 to receive the cam 16, said cam and the coacting surface of the jaw being correspondingly shaped the same as in the first described modification. By having the cam housed within the recess 15, it does not project beyond the general width dimension of the electrode holder at this cross section.

Figure 10 also shows that the thumb lever, which is now indicated by the reference character 17, is mounted "inboard", that is, it is situated between the jaws 4 and 1, and fixed with respect to the bolt 18, so that the cam no longer rotates relative to the bolt as in the first described modification, but rotates with the bolt. This is permitted by the nonrotatable connection represented by the squared portion 19 of the bolt which fits a correspondingly shaped bore in the cam.

In this instance, the spring 7 is located between the jaw 4 and the thumb lever 17; its action being exactly the same as in that form of the invention disclosed in the first seven figures.

The thumb lever 17 will be secured to the bolt 18 in any suitable manner, but it is preferred to employ the construction shown in Figure 11 in which the thumb lever is formed with an eye surrounding the bolt 18. Said bolt is provided with a flat portion 25, and the eye is correspondingly shaped so as to preclude the rotation of the thumb lever relative to said bolt. The eye 18 is preferably formed in two parts, one part 26 being integral with the thumb lever, while the other part 27 consists of a removable lug, said two parts having corresponding flanges 28 and 29, through which passes a screw 30. The part 27, at its free end, extends beneath an overhanging ledge 31 formed on the thumb lever, so that when the parts are in the position shown, the part 27 cannot be deflected at its free end, being overlain by the ledge 31.

In Figure 12, the cam 20, as well as the operating lever 21 are placed "inboard". The cam and the jaw 4 have the complementary concave and convex surfaces the same as before, the cam in this instance operating directly against the inner face of the jaw 4. The spring against the tension of which the cam acts, is housed in a recess 22 in the jaw 4 beneath the head 23 of the bolt 24. In this modification the cam necessarily acts to spread those portions of the jaws between which it is located, consequently, this construction is adapted to an electrode holder such as is indicated in Figure 13 in which the pivotal connection 24' of the jaws is between the locking means and the electrode holding ends of said jaws. In this form of construction, the cam acts to bring the jaws together in clamping relation, while the spring 22 performs its normal function of opening the electrode holding ends of the jaws when the locking means is released.

A true combinative relation exists between the locking means, which brings positive pressure to bear upon the electrode ends of the holding jaws, and the novel form of jaws disclosed by the present invention, as will now appear.

Figures 2 and 5 show that the lower jaw is formed, near its end, with pairs of cooperating notches 32 having bevelled walls forming teeth 33. The provision of one notch on each side is sufficient for carrying out the purpose of the invention, but a pair of notches on each side greatly enhances the flexibility of the device, since it enables an electrode to be placed not only transversely, but also in a diagonal position as shown. The bevelled sides of the teeth form substantial knife edges 34 which dig into the surface of the electrode to a greater or less extent when positive clamping pressure is applied to the jaws through the locking means. It is well understood that the surface of the electrode is generally coated with a flux, and it is well known that this film of flux has relatively poor conductivity. As a result, in ordinary electrode holders where mere resilient pressure is relied upon to hold the electrode in place and where the teeth are entirely absent or not provided with knife edges the jaws do not break through the coating of flux so that the resistance at the points of contact between the electrode and electrode holder is great resulting in excessive heating of the jaws and creating a condition favorable to arcing should the very slightest interruption in contact between the electrode and jaws take place.

By the present invention the provision of knife edges on the jaw teeth, in connection with the positive applied pressure, ensures that the teeth will dig through the film of flux or the like on the surface of the electrode and come into positive contact with bare metal thus ensuring good conductivity, preventing both heating and arcing.

It will be noted from Figure 5 that the acuteness of the bevel of the teeth is such that even in the inclined positions of the electrode, the engagement of the teeth with the electrode is an edge contact and not a surface contact, so that the advantage of the knife edges as above pointed out, is preserved throughout all possible positions of adjustment of the electrode.

Figure 5 shows an additional notch 35, the sides of which are likewise formed with knife edges, said notch being located in the extreme end of the jaw 1, and being designed to hold an electrode extended in the axial line of the electrode holder, or angularly disposed to said axis through such range of movement as may be permitted by the space within which the inner end of said electrode may be shifted.

It will be observed from Figure 2 that when the jaws are in clamped position, there is a three-point contact between the electrode holder and the electrode. This also ensures not only security in holding the electrode, but also good contact.

It will be noted that the end of the upper jaw 4 is made flat. It is unnecessary to form the upper jaw with teeth corresponding to those of the lower jaw, since the lower jaw carries the major part of the current, very little being conducted through the upper jaw. The reason for this is, that the lower jaw is integral with the shank 2, and therefore, possessing an unimpaired continuity of its electrical capacity while the upper jaw is pivoted by a relatively small pivot 36, and is, therefore, in poor conductive relation to the source of current. This does not mean that there will be heating of the upper jaw adjacent its pivotal connection, for the mass of the lower jaw is sufficient to carry the entire amperage. Since the upper jaw carries but little current, there is no danger of arcing between the upper jaw and the electrode, and consequently, the need of special provisions for making good contact between the upper jaw and electrode does not exist.

In this connection, it will be noted that it is possible to make the upper jaw less massive than the lower jaw, the upper jaw being formed slightly arched as indicated at 37, so that while it is approximately rigid yet it possesses a slight degree of resiliency, permitting the cam 6 to be rotated to about the same point in executing its locking movement, regardless of slight differences in the dimensions of the held electrode.

The upper jaw is also preferably recessed as at 38, providing a housing into which, at least, a part of the spring 7 extends, said spring being thus in a great measure protected from accidental contact with any part of the piece of metal being operated upon, which contact would be fatal to the temper of the spring.

The electrode holder is provided with a handle 39 formed of suitable heat and electric insulating material. Since it is quite important that this handle should remain cool enough to be held with comfort at all times, the shank 2 is preferably formed with a cross section such as is shown at 40 in Figure 3. This cross section shows that the shank is provided with flat or concave faces 41 between the ribs 42. Said ribs make frictional contact with the handle 39, and prevent its slipping.

At the same time, said ribs, together with the handle 39 define air spaces 43 extending from a point adjacent the forward end of the handle, preferably throughout the entire extent of the shank. The rearward end of the handle 39 is preferably left open as indicated at 44, thus providing a through-conduit for the passage of cooling air currents.

It would be noted from Figure 4 that the jaws 1 and 2 are, preferably, of a similar cross section to that of the shank 2 to enhance their heat dissipating capacity.

The terminal 3 of the cable which conducts current to the electrode holder, is secured to the shank 2 in a rigid manner which prevents relative movement between the cable and shank, and, therefore, avoids a loose connection which might cause excessive heating at this point and possible arcing with the effect of burning the handle and probably the hand of the operator.

This rigid connection is formed by providing a shoulder 45 on the shank extending transversely across said shank and providing the terminal 3 with a similar transverse end which abuts snugly against said shoulder, preventing any angular movement. Screw 46 holds these elements securely in place, and since there is no tendency of the parts to weave angularly, there is no force tending to loosen the screw.

The operation of the device of this invention and the function of the various parts appear to have been fully described so that a résumé of the operation of the electrode holder does not seem essential at this point. It is apparent, however, to one skilled in the art, that the electrode holder has been designed in every feature to prevent heating and arcing, and that the positive locking means in combination with the novel contact-finding construction of the teeth is a decided factor in accomplishing this result.

It is to be understood that the various specific details by which the principles of the present invention have been illustrated, are merely by way of example and are not to be considered as limiting the scope of the invention.

What I claim is:

1. An electrode holder comprising in combination, jaws, a bolt passing through said jaws, an opening spring on said bolt between said jaws, and a cam on said bolt co-acting with one of said jaws for clamping said jaws together with positive pressure.

2. An electrode holder comprising in combination, jaws, a bolt passing through said jaws, an opening spring on said bolt between said jaws, and a cam on said bolt co-acting against one of said jaws for clamping said jaws together with positive pressure, one of said jaws having a recess surrounding, at least a portion of said spring and serving as a housing for the same.

3. An electrode holder comprising in combination, pivoted jaws, locking means including a bolt passing through said jaws having a polygonal portion fitted in a bore in one of said jaws to prevent normal relative rotation between said bolt and said jaws, and a cam loosely threaded on said bolt co-acting against one of said jaws for clamping said jaws together with positive pressure, said locking means being adjusted by shifting said bolt sufficiently endwise to rotate said bolt relative to said cam.

4. An electrode holder comprising in combination, pivoted jaws, a bolt passing through said jaws, an opening spring on said bolt between said jaws, and a cam on said bolt co-acting with one of said jaws for clamping said jaws together with positive pressure, the part of said jaw upon which said cam seats having sloping sides, and said cam being correspondingly recessed to fit upon said sloping sides in the inactive position of said cam.

5. An electrode holder comprising in combination, pivoted jaws, a bolt passing through said jaws, an opening spring on said bolt between said jaws. a cam on said bolt co-acting with one of said jaws for clamping said jaws together with positive pressure, the part of said jaw upon which said cam seats having sloping sides and said cam being correspondingly recessed to fit upon said sloping sides in the inactive position of said cam, and a resilient wear piece between said cam and jaw conforming in shape to the co-acting faces of said cam and jaw and non-rotatably secured to said jaw.

6. An electrode holder comprising in combination, pivoted jaws; a bolt passing through said jaws, an opening spring on said bolt between said jaws, a cam on said bolt co-acting with one of said jaws for clamping said jaws together with positive pressure, the part of said jaw upon which said cam seats having sloping sides and said cam being correspondingly recessed to fit upon said sloping sides in the inactive position of said cam, and a resilient wear piece between said cam and jaw conforming to the shape of the co-acting faces of said cam and jaw, said wear piece and jaw having interengaging holding parts in relation to which said wear piece is resiliently snapped into place.

7. An electrode holder comprising in combination, pivoted jaws, a bolt passing therethrough, an opening spring on said bolt between said jaws, and a cam on said bolt coacting against one of said jaws for clamping said jaws together with positive pressure, the jaw with which said cam co-acts being formed with a recess into which the cam recedes as it is turned into inoperative position.

8. An electrode holder comprising in combination, pivoted jaws, a bolt passing through said jaws, an opening spring on said bolt between said jaws, a cam on said bolt co-acting with one of said jaws for clamping said jaws together with positive pressure, and a thumb lever for actuating said cam mounted "inboard" with respect to said jaws.

9. An electrode holder comprising in combination, pivoted jaws, a bolt passing through said jaws, an opening spring on the bolt between its head and one jaw, a cam on said bolt between said jaws for clamping said jaws together with positive pressure, and a thumb lever connected to said cam.

10. In a locking device for clamping the jaws of an electrode holder with positive pressure, a rotating cam bolt, and a thumb lever detachably fixed to said cam bolt, said lever having an eye at one end having a flat portion co-acting with a flat side on said cam bolt, said eye having a detachable cap, means for clampably securing said detachable cap to said lever at one side of said cam bolt, said lever being formed with a ledge overlying the free end of said cap for holding the latter against displacement.

11. An electrode holder comprising in combination, pivoted jaws, a bolt through the jaws, a spring on the bolt between the jaws, a cam on the bolt for clamping said jaws together with positive pressure, one of said jaws being formed with teeth adapted to bite transversely into an electrode held by said jaws when said positive pressure is applied by said locking means.

12. An electrode holder comprising in combination, pivoted jaws, and positive locking means for clamping said jaws together, one of said jaws being formed with a pair of notches on each side having bevelled edges forming teeth for digging into said electrode when positive pressure is applied by said locking means, the acuteness of said bevelled edges being such that they preserve an edge contact with said electrode when the latter is adjusted in its extreme inclined positions in said notches.

13. An electrode holder comprising in combination, jaws, a bolt passing through said jaws, a cam on said bolt, a spring on the bolt between the jaws held in compression when said jaws are locked, a cam on the bolt for locking the jaws, the cam and one jaw having co-acting sloped surfaces of such steepness that the spring shall snap the cam to jaw-unlocking position upon being started by the operator.

In testimony whereof I affix my signature.
HERBERT O. RICH.